United States Patent
Shimoda

[19]

[11] Patent Number: 5,917,862
[45] Date of Patent: Jun. 29, 1999

[54] INFORMATION REPRODUCING APPARATUS AND ITS AUTOMATIC EQUALIZATION MAXIMUM LIKELIHOOD DETECTING METHOD

[75] Inventor: Kaneyasu Shimoda, Kawasaki, Japan

[73] Assignee: Fujitsu Limited, Kawasaki, Japan

[21] Appl. No.: 08/541,874

[22] Filed: Oct. 10, 1995

[30] Foreign Application Priority Data

Apr. 18, 1995 [JP] Japan ................................. 7-092157

[51] Int. Cl.⁶ .................................................. H03D 1/00
[52] U.S. Cl. .......................................... 375/341; 375/230
[58] Field of Search ................................. 375/341, 231, 375/232, 230, 229; 329/310; 455/133, 272; 371/43, 41

[56] References Cited

U.S. PATENT DOCUMENTS

| | | | |
|---|---|---|---|
| 3,792,356 | 2/1974 | Kobayashi et al. | 325/42 |
| 5,138,314 | 8/1992 | Shimpuku et al. | 341/58 |
| 5,381,359 | 1/1995 | Abbott et al. | 364/724.19 |
| 5,579,340 | 11/1996 | Tokuriki et al. | 375/232 |
| 5,619,167 | 4/1997 | Adachi | 375/341 |
| 5,621,769 | 4/1997 | Wan et al. | 375/341 |

FOREIGN PATENT DOCUMENTS

| | | |
|---|---|---|
| 116219 | 6/1985 | Japan . |
| 221464 | 8/1992 | Japan . |
| 342513 | 12/1993 | Japan . |
| 164316 | 6/1994 | Japan . |

*Primary Examiner*—Stephen Chin
*Assistant Examiner*—Joseph Roundtree
*Attorney, Agent, or Firm*—Greer, Burns & Crain, Ltd.

[57] ABSTRACT

A maximum likelihood detection of a convolution code Yn obtained by coupling a transversal equalizer to a code Zn of a recording and reproducing channel. A branch metric is arithmetically operated by changing a weight of a data train of a convolution code corresponding to multiplication coefficients of a filter by a distributor with respect to a reproduction signal Rn. On the basis of the branch metric, an ACS circuit judges a maximum likelihood path at every path node and the results are stored into a path memory 56. Simultaneously with the maximum likelihood detection, metrics of the maximum likelihood paths judged with respect to the path nodes are compared by a maximum likelihood path comparing circuit, thereby deciding the maximum likelihood path node. A maximum inclination arithmetic operating circuit calculates a maximum inclination of the multiplication coefficients of the filter. The next multiplication coefficients are updated by an updating circuit.

18 Claims, 16 Drawing Sheets

FIG. 8

| PATH METRIC $X_{n+1}$ $X_n$ $X_{n-1}$ | MAXIMUM LIKELIHOOD PATH $X_{n+2}$ $X_{n+1}$ $X_n$ | BRANCH METRIC $B_n$ |
|---|---|---|
| 0 0 0 | 0 0 0 | $R_n^2$ |
| | 1 0 0 | $(R_n - K_n)^2$ |
| 0 0 1 | 0 0 0 | $(R_n + K_n)^2$ |
| | 1 0 0 | $R_n^2$ |
| 0 1 0 | 0 0 1 | $(R_n - 1 - K_n)^2$ |
| | 1 0 1 | $(R_n - 1 - 2K_n)^2$ |
| 0 1 1 | 0 0 1 | $(R_n - 1)^2$ |
| | 1 0 1 | $(R_n - 1 - K_n)^2$ |
| 1 0 0 | 0 0 1 | $(R_n + 1 + K_n)^2$ |
| | 1 0 1 | $(R_n + 1)^2$ |
| 1 0 1 | 0 1 0 | $(R_n + 1 + 2K_n)^2$ |
| | 1 1 0 | $(R_n + 1 + K_n)^2$ |
| 1 1 0 | 0 1 1 | $R_n^2$ |
| | 1 1 1 | $(R_n - K_n)^2$ |
| 1 1 1 | 0 1 1 | $(R_n + K_n)^2$ |
| | 1 1 1 | $R_n^2$ |

FIG. 9

| INPUT | | OUTPUT | |
|---|---|---|---|
| MAXIMUM LIKELIHOOD PATH NODE | JUDGMENT RESULT | a | b |
| 0 0 0 | 0 | 0 | 0 |
| | 1 | −1 | 0 |
| 0 0 1 | 0 | +1 | 0 |
| | 1 | 0 | 0 |
| 0 1 0 | 0 | −1 | −1 |
| | 1 | −2 | −1 |
| 0 1 1 | 0 | 0 | 0 |
| | 1 | −1 | −1 |
| 1 0 0 | 0 | +1 | 0 |
| | 1 | 0 | 0 |
| 1 0 1 | 0 | +2 | +1 |
| | 1 | +1 | +1 |
| 1 1 0 | 0 | 0 | 0 |
| | 1 | −1 | 0 |
| 1 1 1 | 0 | +1 | 0 |
| | 1 | 0 | 0 |

CP : COMPARATOR
SL : SELECTING CIRCUIT

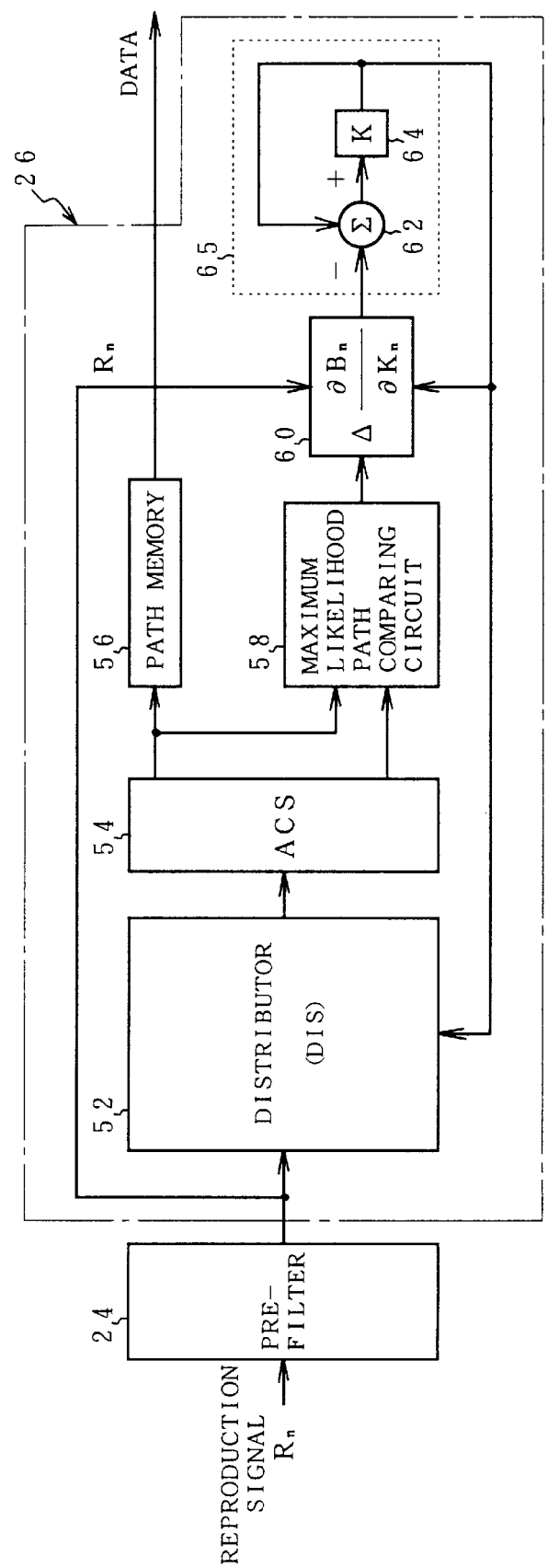
F I G. 16

INFORMATION REPRODUCING APPARATUS AND ITS AUTOMATIC EQUALIZATION MAXIMUM LIKELIHOOD DETECTING METHOD

BACKGROUND OF THE INVENTION

The invention relates to an information reproducing apparatus such as a disk apparatus or the like for demodulating data by an automatic equalization and a maximum likelihood detection of a reproducing channel for a disk medium or the like as a target, and to an automatic equalization maximum likelihood detecting method of such an apparatus. More particularly, the invention relates to an automatic equalization maximum likelihood detecting method of an information reproducing apparatus in which an automatic equalization and a maximum likelihood detection are executed in a lump.

In a magnetic disk apparatus, in correspondence to a high speed transfer and a high density recording, a demodulating method by a partial response maximum likelihood detection in which an equalizer and a maximum likelihood detecting circuit are combined has been put into practical use. However, inter-code interferences differ depending on variations of heads and disk media and track positions and, when an equalization error increases, an error rate deteriorates. On the other hand, when a recording density increases, a deterioration due to the equalization error further becomes remarkable and a margin for the error rate is narrowed. In order to accomplish the high density recording, therefore, it is necessary to compensate the variations by using an adaptive type automatic equalizer as an equalizer.

FIG. 1 shows an example of a conventional adaptive type equalizer. Subsequent to a pre-filter 202 for performing a (1–D) equalization to a reproduction signal, a cosine roll-off type automatic equalizing circuit 204 is provided and its equalization output is supplied to a maximum likelihood detecting circuit 206. The cosine roll-off type automatic equalizing circuit 204 constructs a transversal filter 208 by delay circuits 210-1 and 210-2, adders 212 and 214, and a multiplier 222 of a tap coefficient. However, a conventional apparatus comprising such adaptive type automatic equalizer and maximum likelihood detecting circuit has a problem such that when the number of errors increases in a code of a magnetic recording and reproducing channel, an erroneous judgment in an output of the filter frequently occurs and the equalization error doesn't decrease.

SUMMARY OF THE INVENTION

According to the invention, an information processing apparatus and an automatic equalization maximum likelihood detecting method which can reduce an equalization error by raising a precision of judgment are provided.

The invention is characterized in that for a convolution code Yn, as a target, obtained by coupling a transversal equalizer to a code Zn of a recording and reproducing channel for recording and reproducing data to/from a disk medium by using the head, for example, the data is demodulated by the automatic equalization maximum likelihood detecting circuit on the basis of the judgment of a maximum likelihood path and, at the same time, a weight of convolution code Yn is changed so as to reduce a distribution of a branch metric by using the judgment result of the maximum likelihood path.

The automatic equalization maximum likelihood detecting circuit is constructed by: a distributor for arithmetically operating a branch metric by changing a weight of the convolution code Yn corresponding to multiplication coefficients of a transversal equalizer; an add/compare/select circuit (ACS circuit) for judging the maximum likelihood path every path node on the basis of the branch metric Bn operated by the distributor; a path memory for storing a career of the maximum likelihood path of every path node; a maximum likelihood path comparing circuit for comparing path metrics of all states and deciding the maximum likelihood path node; a maximum inclination arithmetic operating module for calculating a maximum inclination of the multiplication coefficients of a filter at the maximum likelihood path node; and a multiplication coefficient updating module for arithmetically operating the next multiplication coefficients, wherein the automatic equalization and the maximum likelihood detection are executed in a lump.

A maximum inclination arithmetic operating module of the automatic equalization maximum likelihood detecting circuit can be constructed by, for example: a selecting circuit for selecting a path judgment value in the add/compare/select circuit on the basis of the decision result of the maximum likelihood path node by the maximum likelihood path comparing circuit; a table for outputting a coefficient and a constant of an inclination value of the maximum inclination arithmetic operation by the reference by the maximum likelihood path node decided by the maximum likelihood path comparing circuit and the path judgment value selected by the selecting circuit; and an arithmetic operating circuit for arithmetically operating the maximum inclination of the multiplication coefficients by using the coefficient and constant outputted from such a table.

As another construction of the maximum inclination arithmetic operating circuit 60 of the automatic equalization maximum likelihood detecting circuit 26, it can be also realized by: an arithmetic operating circuit for arithmetically operating the maximum inclination value with respect to all of the path nodes; a maximum likelihood path comparing circuit for comparing each path metric of the add/compare/select circuit and selecting the maximum likelihood path; and a selecting circuit for selecting the maximum inclination value of the maximum likelihood path from the maximum inclination values of the path nodes on the basis of the comparison result of the maximum likelihood path comparing circuit and outputting.

In this case, by providing a circuit (FF) for holding the path metric in the way of the comparison for the maximum likelihood path comparing circuit and a circuit (FF) for holding the maximum inclination value on the way of the selection for the selecting circuit of the maximum inclination, pipeline processes can be executed.

The automatic equalization maximum likelihood detecting circuit can be also constructed in a manner such that a training data transition path forming circuit for forming a path node that is determined by training data and a selecting circuit for selecting the maximum likelihood path node formed by the training data transition path forming circuit in place of the maximum likelihood path node decided by the maximum likelihood path comparing circuit at the time of initialization and for outputting to the maximum inclination arithmetic operating circuit are further provided and, upon initialization, the multiplication coefficients of the filter are selected by the maximum likelihood path node that is determined by the training data, and the maximum inclination is updated.

The multiplication coefficient updating circuit of the automatic equalization maximum likelihood detecting circuit can be also constructed in a manner such that a selecting circuit for switching at least two large and small updating step widths and a multiplying circuit for changing an amplitude of the maximum inclination value by using the updating step width selected by the selecting circuit are provided, the larger updating step width is selected by the selecting circuit for an initial period of time, an updating step of the maximum inclination is increased, and a convergence performance is raised.

The multiplication coefficient updating circuit of the automatic equalization maximum likelihood detecting circuit can be also constructed in a manner such that a table in which multiplication coefficients have been stored every track of the disk medium and a selecting circuit for selecting the multiplication coefficients of the table which was referred by track information in place of the output of the maximum inclination arithmetic operating circuit at the time of the training are provided and, at the end of the training, the initial values of the multiplication coefficients in the table are updated by the multiplication coefficients obtained by the training.

Further, a pre-filter for equalizing to the code of the recording and reproducing channel is provided at the front stage of the automatic equalization maximum likelihood detecting circuit. The pre-filter has: an analog pre-filter; a sampler for sampling an output signal of the analog pre-filter at a sampling period; and a transversal filter for inputting sample data by the sampler and equalizing its waveform.

On the other hand, the invention intends to provide an automatic equalization maximum likelihood detecting method of a disk apparatus and is characterized in that the convolution code Yn obtained by coupling the transversal filter to the code Dn of the recording and reproducing channel for recording and reproducing data to/from the disk medium by using the head is used as a target, the data is demodulated by the judgment of the maximum likelihood path, and a weight of convolution code is changed so as to reduce a distribution of the branch metric Bn by using the judgment result of the maximum likelihood path.

That is, the invention is characterized by comprising:

a maximum likelihood detecting step of arithmetically operating a branch metric Bn by changing the weight of convolution code Yn corresponding to the multiplication coefficients of the transversal equalizer, judging the maximum likelihood path for every path node on the basis of the branch metric Bn, and storing as a career of the maximum likelihood path into a path memory 56; and an automatic equalizing step of deciding the maximum likelihood path node by comparing the path metrics of all states, calculating the maximum inclination of the multiplication coefficients of the filter at the maximum likelihood path node, and arithmetically operating the next multiplication coefficients on the basis of the maximum inclination of the multiplication coefficients, and wherein the automatic equalization and the maximum likelihood detection are executed in a lump.

The other automatic equalization maximum likelihood detecting methods are fundamentally the same as that in case of the foregoing construction of the apparatus.

According to such reproducing apparatus and automatic equalization maximum likelihood detecting method of the invention, a reproduction signal Rn from the recording and reproducing channel is used as a target, a weight of data train of the convolution code corresponding to the multiplication coefficients of the filter is changed by the distributor and the branch metric is arithmetically operated, the add/compare/select circuit judges the maximum likelihood path every path node on the basis of the branch metric in accordance with a maximum likelihood Viterbi decoding method and stores the result into the path memory. Simultaneously with such a maximum likelihood detection, the metric of the maximum likelihood path judged with respect to each path node is compared by the maximum likelihood path comparing circuit, the maximum likelihood path node is determined, the maximum inclination of the multiplication coefficients of the filter at the maximum likelihood path node decided is calculated, and the next multiplication coefficients are updated in such a direction as to reduce the branch metric. Since the judgment value on the way of the maximum likelihood detection is used as an estimation value of the filter as mentioned above, a fast convergence performance is obtained and the equalization error can be rapidly reduced.

The above and other objects, features, and advantages of the present invention will become more apparent from the following detailed description with reference to the drawings.

BRIEF DESCRIPTION OF THE DRAWINGS

FIG. 8 is an explanatory diagram of a branch metric which is arithmetically operated by a distributor in FIG. 6;

FIG. 9 is an explanatory diagram of a maximum inclination arithmetic operation table in FIG. 6;

FIG. 16 is a block diagram of the fifth embodiment of the automatic equalization maximum likelihood detecting circuit in FIG. 2.

DETAILED DESCRIPTION OF THE PREFERRED EMBODIMENTS

Figure 1:
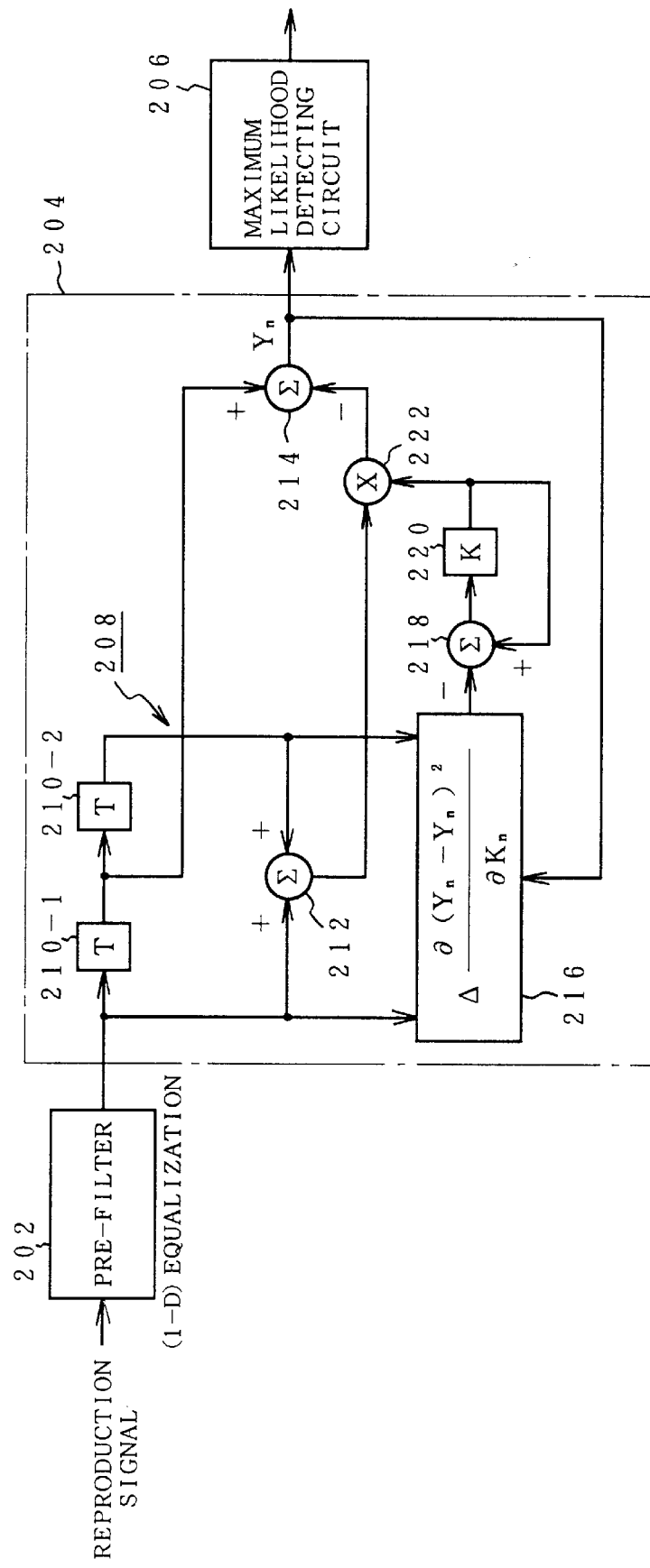
FIG. 1 is a block diagram in which conventional adaptive type equalizer and maximum likelihood detecting circuit are combined.
Figure 2:
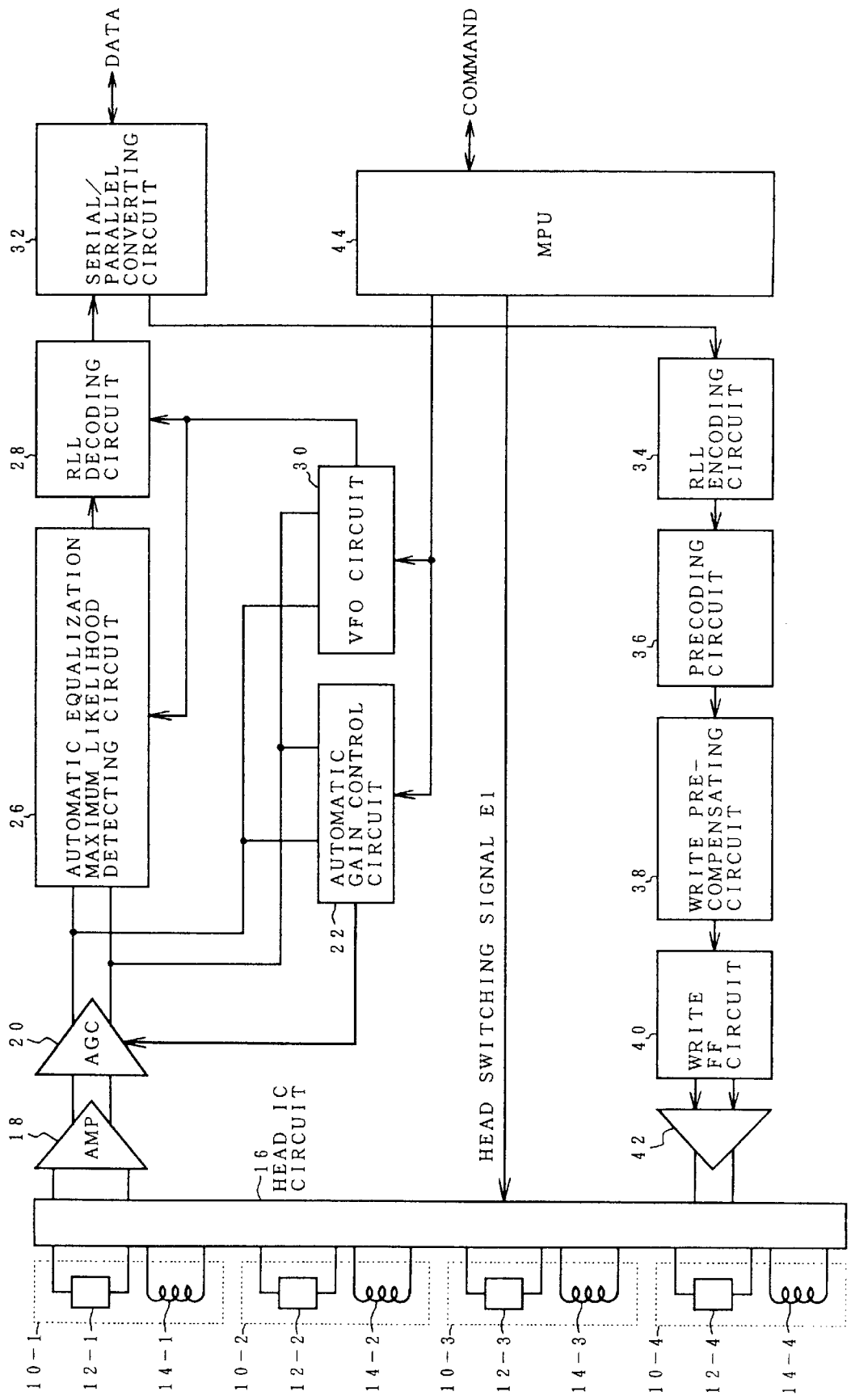
FIG. 2 is a block diagram of a disk apparatus to which the invention is applied.

FIG. 2 is a block diagram showing an embodiment of a disk apparatus as an information processing apparatus to which an automatic equalization maximum likelihood detecting method of the invention is applied. For example, four combination heads 10-1 to 10-4 are connected to a head IC circuit 16. The combination heads 10-1 to 10-4 have: MR heads 12-1 to 12-4 which operate as read heads; and write heads 14-1 to 14-4, respectively. Magnetoresistive elements are used as MR heads 12-1 to 12-4. In a state in which a specified sense current is supplied by the head IC circuit 16, each MR head reads out information recorded on a disk medium. Inductive heads are used as write heads 14-1 to 14-4. In the writing operation, the head IC circuit 16 selects any one of the write heads 14-1 to 14-4 by a head switching signal E1 from an MPU 44 and executes the writing operation to the disk medium. In the reading operation, the head IC circuit 16 selects any one of the MR heads 12-1 to 12-4 and outputs a read signal from the disk medium. A demodulating circuit of the reading system comprises: a fixed gain amplifier 18; an automatic gain control amplifier 20; an automatic gain control circuit 22; an automatic equalization maximum likelihood detecting circuit 26; an RLL decoding circuit 28; a VFO circuit 30; and a serial/parallel converting circuit 32. A gain of the automatic gain control amplifier 20 is controlled by the automatic gain control circuit 22.

Figure 3:
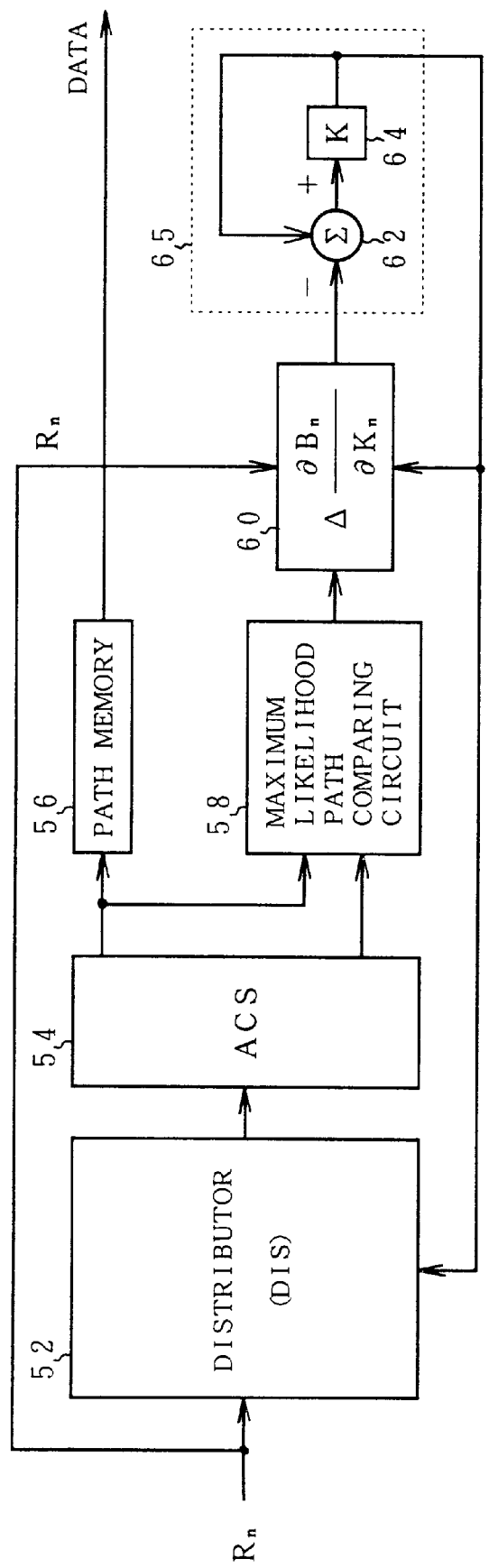
FIG. 3 is a block diagram of the first embodiment of an automatic equalization maximum likelihood detecting circuit in FIG. 2.

As shown in FIG. 3, the automatic equalization maximum likelihood detecting circuit 26 is constructed by: a distributor 52; an add/compare/select circuit (hereinafter, referred to as an ACS circuit) 54; a path memory 56; a maximum likelihood path comparing circuit 58; a maximum inclination arithmetic operating circuit 60; and a multiplication coefficient updating circuit 65. The distributor 52 changes a weight of convolution code Yn corresponding to multiplication coefficients of a transversal equalizer and arithmetically operates a branch metric every eight path nodes in case of, for instance, the convolution code Yn of a restriction length m=3. The ACS circuit 54 judges the maximum likelihood path every eight path nodes on the basis of the branch metric calculated by the distributor 52. A result of the maximum likelihood path at every node judged by the ACS circuit 54 is stored in the path memory 56. When a memory length reaches a predetermined length, a path memory output of an arbitrary path node is outputted as demodulation data. The maximum likelihood path comparing circuit 58 compares a path metric of the maximum likelihood path judged by the ACS circuit 54 with respect to each path node and decides a maximum likelihood path node. The maximum inclination arithmetic operating circuit 60 calculates the maximum inclination of the multiplication coefficients of the filter at the maximum likelihood path node decided by the maximum likelihood path comparing circuit 58. The multiplication coefficient updating circuit 65 has an adder 62 and a holding circuit 64. The adder 62 adds the maximum inclination value of the filter multiplication coefficients to present multiplication coefficients (K) held in the holding circuit 64, thereby updating the next multiplication coefficients in such a direction as to reduce the branch metric.

Referring again to FIG. 2, the RLL decoding circuit 28, provided subsequent to the automatic equalization maximum likelihood detecting circuit 26, corresponds to an RLL encoding circuit 34 provided on the modulating circuit side of a writing system and uses an arbitrary RLL code. The RLL decoding circuit 28 converts data outputted from the automatic equalization maximum likelihood detecting circuit 26 to NRZ data by a reverse conversion of the RLL code and, after that, transfers as parallel NRZ data to an upper apparatus through the serial/parallel (S/P) converting circuit 32. Further, the VFO circuit 30 which generates a clock pulse for a timing control is provided for the demodulating circuit of the reading system. The S/P converting circuit 32 converts the parallel NRZ data transferred from the upper apparatus at the time of the writing operation to the serial NRZ data and outputs to the modulating circuit of the writing system. The modulating circuit of the writing system is constructed by: the RLL encoding circuit 34; a preceding circuit 36; a write pre-compensating circuit 38; a write FF circuit 40; and a driving circuit 42. The RLL encoding circuit 34 converts the inputted NRZ data to a predetermined RLL code. The preceding circuit 36 executes a 1/(1+D) conversion. The write pre-compensating circuit 38 executes a write compensation. The write FF circuit 40 and driving circuit 42 execute the writing operation to the magnetic disk medium by any one of the write heads 14-1 to 14-4 selected by the head IC circuit 16 at that time. The MPU 44 receives an access command from the upper apparatus and decodes and performs the writing or reading operation.

A principle of a process for calculating and updating the maximum inclination of the multiplication coefficients of the filter in the automatic equalization maximum likelihood detecting circuit in FIG. 3 will now be described with respect to a general form. First, the code Zn of the magnetic recording and reproducing channel by the disk medium and the head is $$Z_n = D_n - D_{n+1}$$

From the code Zn and multiplications $K^{(0)}$ to $K^{(m)}$ of the filter of the transversal type, a coupling code is obtained by the following equation.

$$\begin{aligned} Y_n &= K^{(0)}Z_n + K^{(1)}Z_{n+1} + K^{(2)}Z_{n+2} + \cdots + K^{(m)}Z_{n+m} \quad (1) \\ &= K^{(0)}(D_n - D_{n+1}) + K^{(1)}(D_{n+1} - D_{n+2}) + \\ &\quad K^{(2)}(D_{n+2} - D_{n+3}) + \cdots + K^{(m)}(D_{n+m} - D_{n+m+1}) \\ &= K^{(0)}D_n + (K^{(1)} - K^{(0)})D_{n+1} + (K^{(2)} - K^{(1)})D_{n+2} + \cdots + \\ &\quad (K^{(m)} - K^{(m-1)})D_{n+m} - K^{(m)}D_{n+m+1} \end{aligned}$$

Now, assuming that a judgment value in the maximum likelihood detection is set to X, a reproduction signal which is presumed by the maximum likelihood detection is obtained by the following equation.

$$\hat{Y}_n' = K^{(0)}X_n + (K^{(1)} - K^{(0)})X_{n+1} + \quad (2)$$
$$(K^{(2)} - K^{(1)})X_{n+2} + \cdots + (K^{(m)} - K^{(m-1)})X_{n+m} - K^{(m)}X_{n+m+1}$$

Now, assuming that a reproduction signal at time (n) is set to Rn, a branch metric Bn is calculated by the distributor 52 with respect to all states while including an Euclidean distance of the following equation.

$$B_n = (R_n - \hat{Y}_n)^2 \quad (3)$$

Assuming that the restriction length of the coupling code is set to (m), the ACS circuit 54 has a circuit for executing the ($2^m$) adding, comparing, and selecting operations and adds the branch metrics from the distributor 52 and the path metric and compares, thereby calculating path metrics of the alive paths. The judgment result at every path node by the ACS circuit 54 is stored in the path memory 56. Now, assuming that the path memory 56 has stored a maximum likelihood path of a predetermined length, the judged result of the maximum likelihood paths are sequentially outputted from the path memory of the proper path node in accordance with the order from the previous judged result and they become the demodulated data.

On the other hand, the maximum likelihood path comparing circuit 58 compares the path metrics in all states which were calculated by the ACS circuit 54 and selects the judgment value (X) of the maximum likelihood path node. On the basis of the judgment value (X) selected by the maximum likelihood path comparing circuit 58, the maximum inclination arithmetic operating circuit 60 calculates the maximum inclination of the multiplication coefficients of the filter at the maximum likelihood path node in accordance with the following equations.

$$\begin{aligned}
\frac{\partial B_n}{\partial K^{(0)}} &= 2(\hat{X}_n{}' - \hat{X}_{n+1}{}')(R_n - \hat{Y}_n{}') \\
\frac{\partial B_n}{\partial K^{(1)}} &= 2(\hat{X}_{n+1}{}' - \hat{X}_{n+2}{}')(R_n - \hat{Y}_n{}') \\
\frac{\partial B_n}{\partial K^{(2)}} &= 2(\hat{X}_{n+2}{}' - \hat{X}_{n+3}{}')(R_n - \hat{Y}_n{}') \\
&\vdots \\
\frac{\partial B_n}{\partial K^{(m)}} &= 2(\hat{X}_{n+m}{}' - \hat{X}_{n+m+1}{}')(R_n - \hat{Y}_n{}')
\end{aligned} \qquad (4)$$

The multiplication coefficient updating circuit 65 updates the multiplication coefficient in such a direction as to reduce the branch metric by using a maximum inclination method. That is, the following multiplication coefficients are updated by the following equations.

$$\begin{aligned}
K_{n+1}{}^{(0)} &= K_n{}^{(0)} - \Delta \frac{\partial B_n}{\partial K^{(0)}} \\
K_{n+1}{}^{(1)} &= K_n{}^{(1)} - \Delta \frac{\partial B_n}{\partial K^{(1)}} \\
K_{n+1}{}^{(2)} &= K_n{}^{(2)} - \Delta \frac{\partial B_n}{\partial K^{(2)}} \\
&\vdots \\
K_{n+1}{}^{(m)} &= K_n{}^{(m)} - \Delta \frac{\partial B_n}{\partial K^{(m)}}
\end{aligned} \qquad (5)$$

where, $\Delta$ denotes an updating step width

In the automatic equalization maximum likelihood detecting circuit in FIG. 3, the automatic equalization and the maximum likelihood detection are simultaneously processed as mentioned above.

Figure 4:
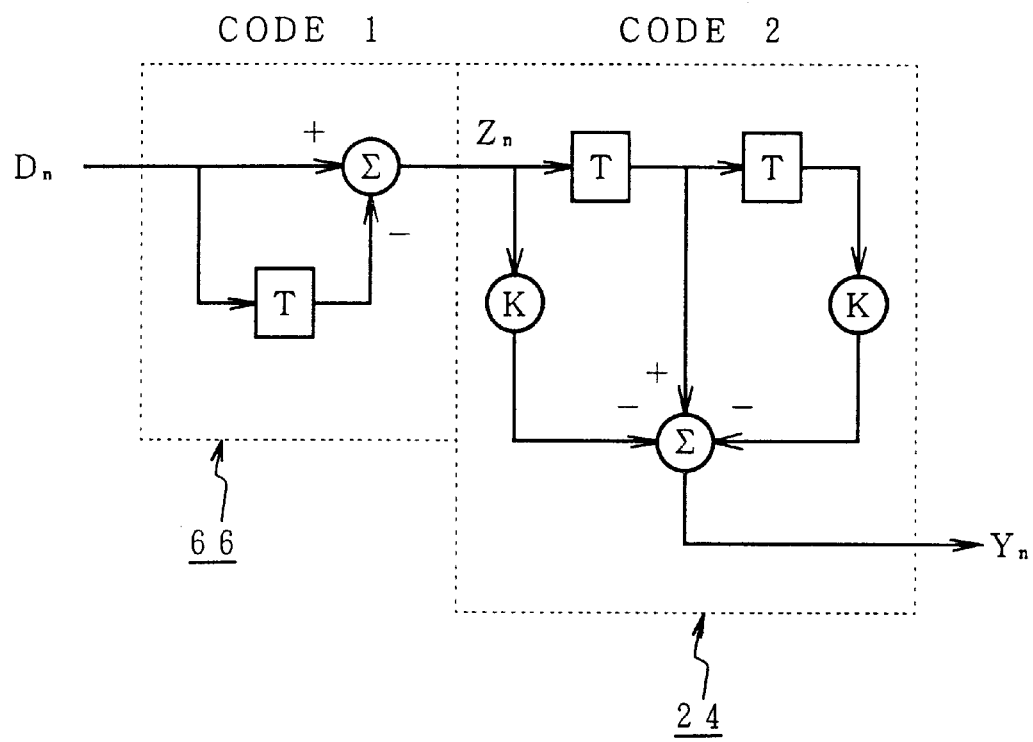
FIG. 4 is a diagram showing an equalizing circuit for forming a coupling code as a target in the invention.

A specific example of the automatic equalization maximum likelihood detecting circuit in FIG. 3 will now be described with respect to a case of using a transversal filter of a cosine equalizing type as a transversal type filter for forming a coupling code as an example. FIG. 4 shows an equalizing circuit for coupling a code 2 of a transversal type filter 24 to perform the cosine equalization to a code 1 of a magnetic recording and reproducing channel 66. When it is assumed that a channel code of the magnetic recording and reproducing channel 66 is $$Z = D_n - D_{n+1}$$

and a multiplication of the cosine equalization of the cosine equalizing type transversal filter 24 is equal to Kn, the coupling code Yn is $$Y_n = Z_n - K_n(Z_{n-1} + Z_{n+1})$$

Therefore, the code Yn in which the code 1 of the magnetic recording and reproducing channel 66 and the multiplication of the transversal type filter 24 are coupled as a convolution code is $$\begin{aligned}
Y_n &= D_n - D_{n+1} - K_n(D_{n-1} - D_n + D_{n+1} - D_{n+2}) \\
&= -K_n D_{n-1} + (1 + K_n)D_n - (1 + K_n)D_{n+1} + K_n D_{n+2}
\end{aligned} \qquad (6)$$

Figure 5:
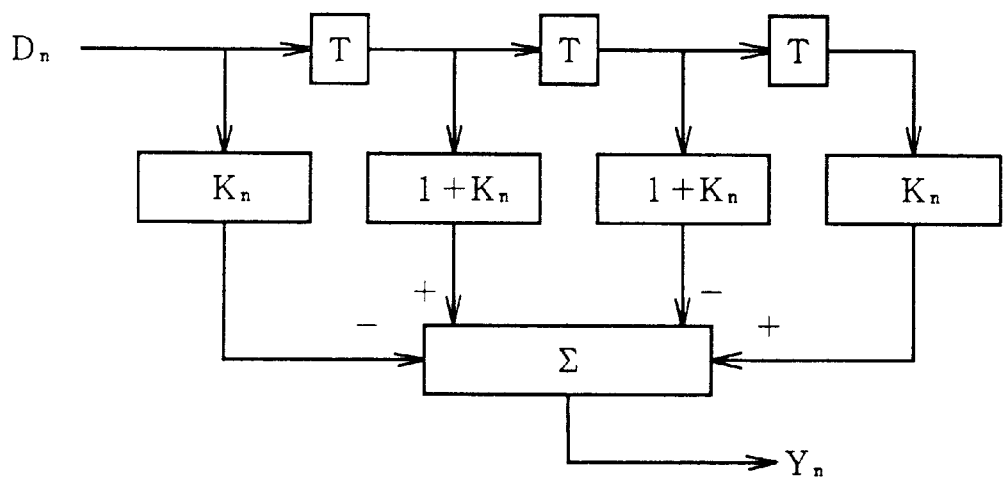
FIG. 5 is a diagram showing an equalizing circuit showing the formation of the coupling code in FIG. 4 as a general form.

FIG. 5 shows an equalizing circuit showing the formation of the coupling code Yn of the equation (6) as a general form. Now, assuming that the judgment value in the maximum likelihood detection is set to (X), the estimation value for the reproduction signal Rn is obtained by the following equation.

$$\hat{Y}_n = -K_n X_{n-1} + (1+K_n)X_n - (1+K_n)X_{n+1} + K_n X_{n+2} \qquad (7)$$

Since the distributor 52 in FIG. 3 changes the weight of data train of the convolution code corresponding to the multiplication coefficients of the filter and calculates the branch metric, an Euclidean distance between the reproduction signal Rn and the estimation value according to the following equation is calculated.

$$B_n = (R_n - \hat{Y}_n)^2 \qquad (8)$$

The ACS circuit 54 has $2^3$ (=8) independent circuits for addition, comparison, and selection. Each circuit adds the branch metric Bn and the path metric from two path nodes which are coupled to the same node from the distributor 52 and compares and calculates the path metric by using a smaller one as an alive path. Eight judgment results by the ACS circuit 54 are stored in the path memory 56. The judgement results of the maximum likelihood paths are sequentially outputted in accordance with the order they were intiially stored and become the demodulation data.

On the other hand, the maximum likelihood path comparing circuit 58 compares the path metrics in all states obtained by the ACS circuit 54 and selects the judgment value (X) of the maximum likelihood path node. On the basis of the judgment value (X) selected by the maximum likelihood path comparing circuit 58, the maximum inclination arithmetic operating circuit 60 calculates the maximum inclination of the multiplication coefficients of the filter at the maximum likelihood path node by the following equation.

$$\begin{aligned}
\frac{\partial B_n}{\partial K_n} &= 2(Z_{n-1} + Z_{n+1})(R_n - \hat{Y}_n{}') \\
&= 2(\hat{X}_{n-1}{}' - \hat{X}_n{}' + \hat{X}_{n+1}{}' - \hat{X}_{n+2}{}')(R_n - \hat{Y}_n{}')
\end{aligned} \qquad (9)$$

Figure 6:
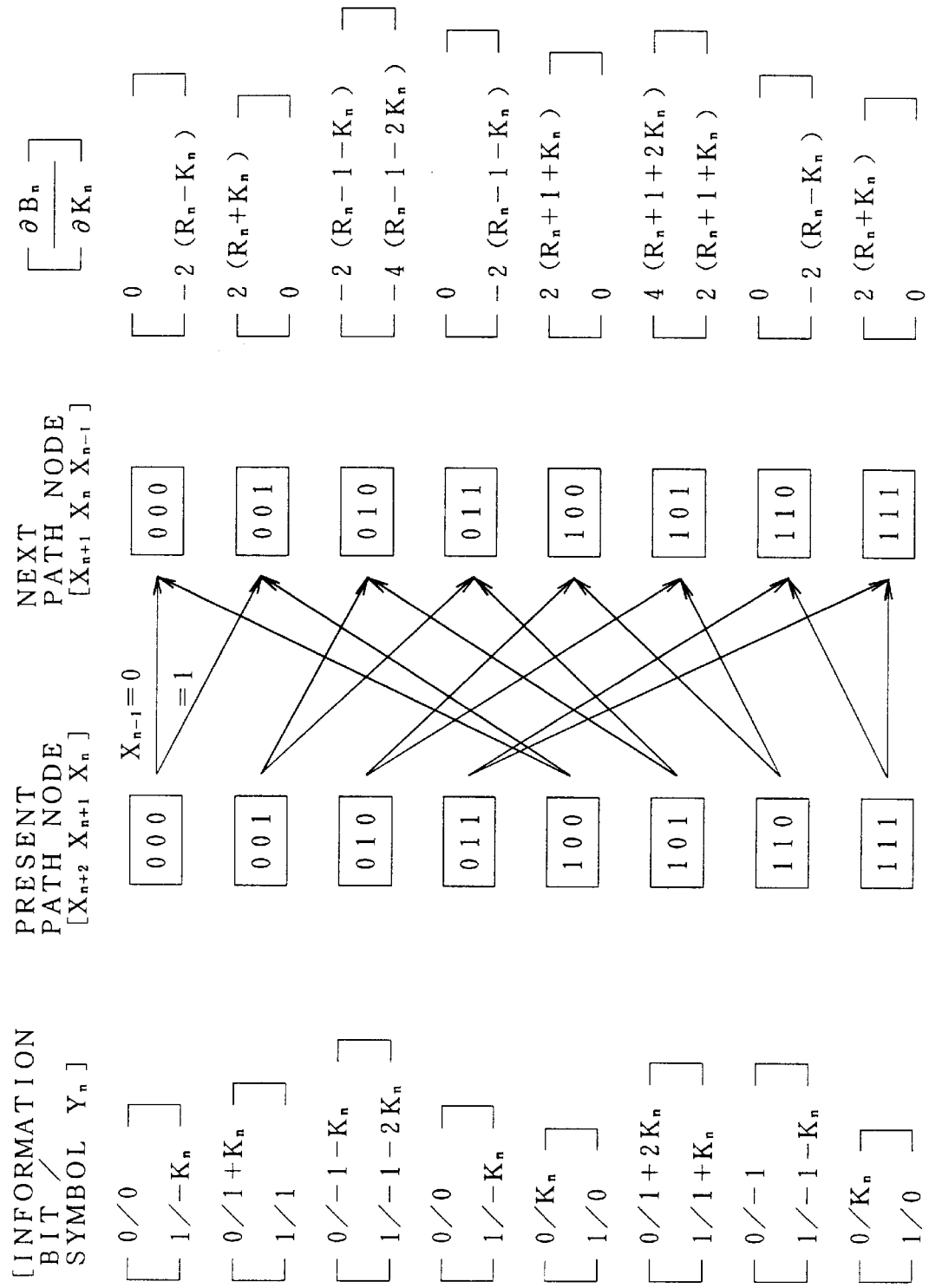
FIG. 6 is a trellis diagram of the equalization maximum likelihood detection of the invention for the coupling code in FIG. 5 as a target.

The relation between the state transition at that time and the maximum inclination of the branch metric that is given by the above equation (9) is as shown in a trellis diagram of FIG. 6. In the trellis diagram of FIG. 6, estimation values which are calculated by the above equation (7) for input information bits 0 and 1 with respect to path nodes 000 to 111 at the present time point are shown on the left side. For example, with regard to the node of the path node (Xn+2, Xn+1, Xn)=000 which is expressed by the present time point and the past two time points, the estimation value in case of the information bit 0 is equal to 0 and the estimation value in case of the information bit 1 is equal to -Kn. The path nodes 000 to 111 by the input of the information bits at the next time are shown on the right side of the present path nodes. The path node at the next time is expressed by (Xn+1, Xn, Xn−1) and two paths are coupled from one-preceding path node. For example, in case of the path node 000, the paths are coupled from the one-preceding path node 000 and the path node 100. With respect to the two paths coupled from the one-preceding path node, the likelihood path remains as an alive path. The maximum inclination values of the branch metrics which are calculated by the equation (9) are shown on the right side of the next path nodes 000 to 111. For example, in case of the path node 000 at the next time, as a maximum inclination value of the branch metric, the maximum inclination value=0 that was calculated by the equation (9) by using the estimation value=0 when the information bit 1 is inputted in the one-preceding path node 000 is shown on the upper side. The maximum inclination value=−2 (Rn−Kn) calculated from the estimation value=Kn of the information bit 0 in the one-preceding path node 100 is shown on the lower side. With respect to the other remaining path nodes 001 to 111, the maximum inclination values calculated are shown with regard to the two path nodes which are coupled to the upper and lower positions from the one-preceding path node.

Referring again to FIG. 3, the multiplication coefficient updating circuit 65 subsequently updates the multiplication coefficients in such a direction as to reduce the branch metric by using the maximum inclination method. That is, the multiplication coefficients are updated in accordance with the following equation.

$$K_{n+1} = K_n - \Delta \frac{\partial B_n}{\partial K_n} \qquad (10)$$
$$= K_n - \Delta 2(\hat{X}_{n-1}' - \hat{X}_n' + \hat{X}_{n+1}' - \hat{X}_{n+2}')(R_n - \hat{Y}_n')$$

where, Δ denotes the updating step width

A specific embodiment of the automatic equalization maximum likelihood detecting circuit in FIG. 3 for the coupling code Yn which is given by the above equations (6) to (10) as a target will now be described.

Figure 7:
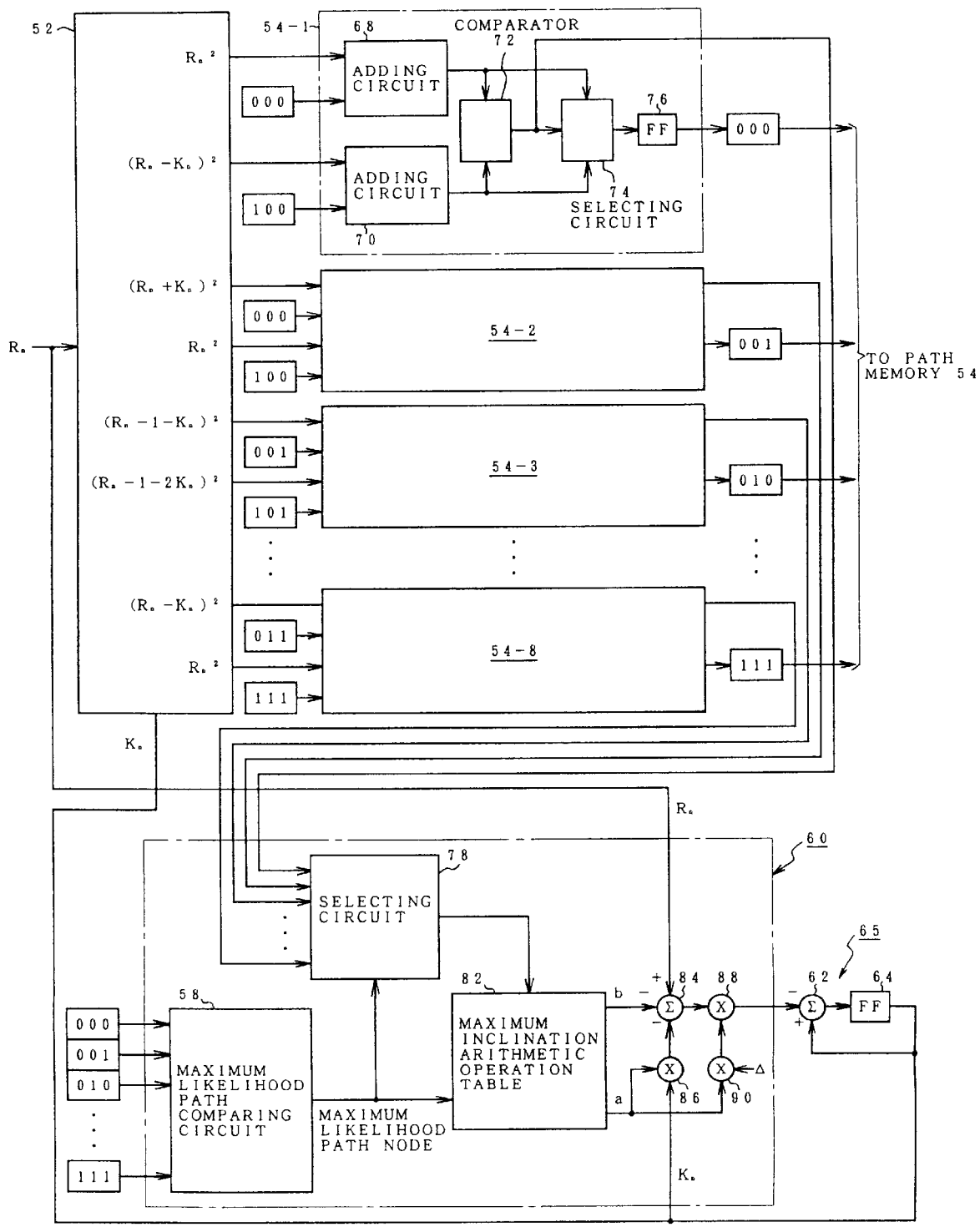
FIG. 7 is a block diagram showing a specific embodiment of the automatic equalization maximum likelihood detecting circuit in FIG. 2.

FIG. 7 shows a specific embodiment of the automatic equalization maximum likelihood detecting circuit in FIG. 3. On the basis of the reproduction signal Rn, the distributor 52 calculates the branch metric Bn as an Euclidean distance Bn of the reproduction signal Rn and the estimation value in accordance with the equation (8). FIG. 8 shows the calculation contents of the branch metric Bn by the distributor 52. FIG. 8 shows the branch metric (Euclidean distance) Bn which is given by the above corresponding equation (8) when either one of the two one-preceding path nodes is set to the maximum likelihood path node with respect to the path nodes 000 to 111 at the next time in the trellis diagram of FIG. 6.

Referring again to FIG. 7, $2^3$ (=8) ACS circuits 54-1 to 54-8 are provided subsequent to the distributor 52. As representatively shown in the ACS circuit 54-1, each of the ACS circuits 54-1 to 54-8 is constructed by adding circuits 68 and 70, a comparator 72, a selecting circuit 74, and an FF 76. Namely, the ACS circuit 54-1 is provided with respect to the path node 000. As will be obviously understood from the trellis diagram of FIG. 6, since the one-preceding path nodes 000 and 100 are connected to the pass node 000, the path metric of the one-preceding path node 000 is inputted to the adding circuit 68 and the branch metric $Rn^2$ calculated by the distributor 52 is also inputted. The path metric of the one-preceding path node 100 is inputted to the adding circuit 70 and the branch metric $(Rn-Kn)^2$ calculated by the distributor 52 with respect to the path node 100 is also inputted. The adding circuit 68 adds the branch metric from the distributor 52 and the path metric from the one-preceding path node. The result is compared by the comparator 72. A comparison output of the comparator 72 is supplied to the selecting circuit 74 and a smaller one of the addition values calculated by the adding circuits 68 and 70 is selected as an alive path and is latched into the FF 76. The selection result of the FF 76 is stored as a career into the path memory 56. On the other hand, the selection result of the one-preceding path node 000 or 100 by the comparator 72 is supplied to a selecting circuit 78 provided for the maximum inclination arithmetic operating circuit 60 on the lower side. Such a construction of the ACS circuit 54-1 shall also apply to the other remaining ACS circuits 54-2 to 54-8. Although the ACS circuits 54-4 to 54-7 are not shown, substantially the same circuit is provided and the output of the path node and the path node for inputting the one-preceding path metric are as shown in the trellis diagram of FIG. 6.

The maximum likelihood path comparing circuit 58 is provided for the maximum inclination arithmetic operating circuit 60. In FIG. 3, although the maximum likelihood path comparing circuit 58 is provided as a circuit that is independent of the maximum inclination arithmetic operating circuit 60, it is shown so as to be included in the maximum inclination arithmetic operating circuit 60 for convenience of explanation. The selected values on the maximum likelihood path side which are obtained by adding the branch metrics and path metrics shown in the path nodes 000 to 111 of the ACS circuit 54-1 are inputted to the maximum likelihood path comparing circuit 58 with respect to eight states. The maximum likelihood path comparing circuit 58 compares outputs from the eight ACS circuits 54-1 to 54-8 and selects the path having the smallest value as a maximum likelihood path node. The maximum likelihood path node selected by the maximum likelihood path comparing circuit 58 is supplied to the selecting circuit 78. The path on the maximum likelihood side and of the maximum likelihood path node between the two paths from the one-preceding path nodes given from the comparators 72 of each of the ACS circuits 54-1 to 54-8 to the selecting circuit 78 is selected. The judgment result of the maximum likelihood path by the comparator 72 is set to 0 in the case where the upper one-preceding path node is selected and is set to 1 when the path of the lower path node is selected. The judgment result selected by the selecting circuit 78 and the maximum likelihood path node selected by the maximum likelihood path comparing circuit 58 are used in reference information of a maximum inclination arithmetic operation table 82.

As shown in FIG. 9, the judgment results 0 and 1 on the maximum likelihood side of the paths from the maximum likelihood path nodes 000 to 111 and the one-preceding path node for the maximum likelihood path nodes are used as addresses and a coefficient (a) and a constant (b) which are used in the arithmetic operation of the maximum inclination of the multiplication coefficients of the filter are stored in the maximum inclination arithmetic operation table 82. Therefore, by referring to the maximum inclination arithmetic operation table 82 by the judgment values by the selecting circuit 78 and the values of the maximum likelihood path nodes by the maximum likelihood path comparing circuit 58, the coefficient (a) and constant (b) according to the maximum inclination arithmetic operation table 82 in FIG. 9 are obtained. The coefficient (a) and constant (b) obtained from the maximum inclination arithmetic operation table 82 are supplied to an arithmetic operating circuit comprising an adder 84 and multipliers 86, 88, and 90. The maximum inclination value of the multiplication coefficients based on the equation (9) is obtained. However, such an arithmetic operation of the maximum inclination value is executed in accordance with the following equation without executing the equation (9) as it is in order to simplify the storage of the coefficient (a) and constant (b) in the maximum inclination arithmetic operation table 82.

$$\Delta \cdot \frac{\partial Bn}{\partial Kn} = (\Delta \cdot 2)a(Rn - b - a \cdot Kn) \qquad (11)$$

The maximum inclination value of the multiplication coefficients calculated by the maximum inclination arithmetic operating circuit 60 is supplied to the multiplication coefficient updating circuit 65 comprising the adder 62 and holding circuit 64 provided at the final stage. The multiplication coefficients are updated in such a direction as to reduce the branch metric by using the maximum inclination method in accordance with the above equation (10).

Figure 10:
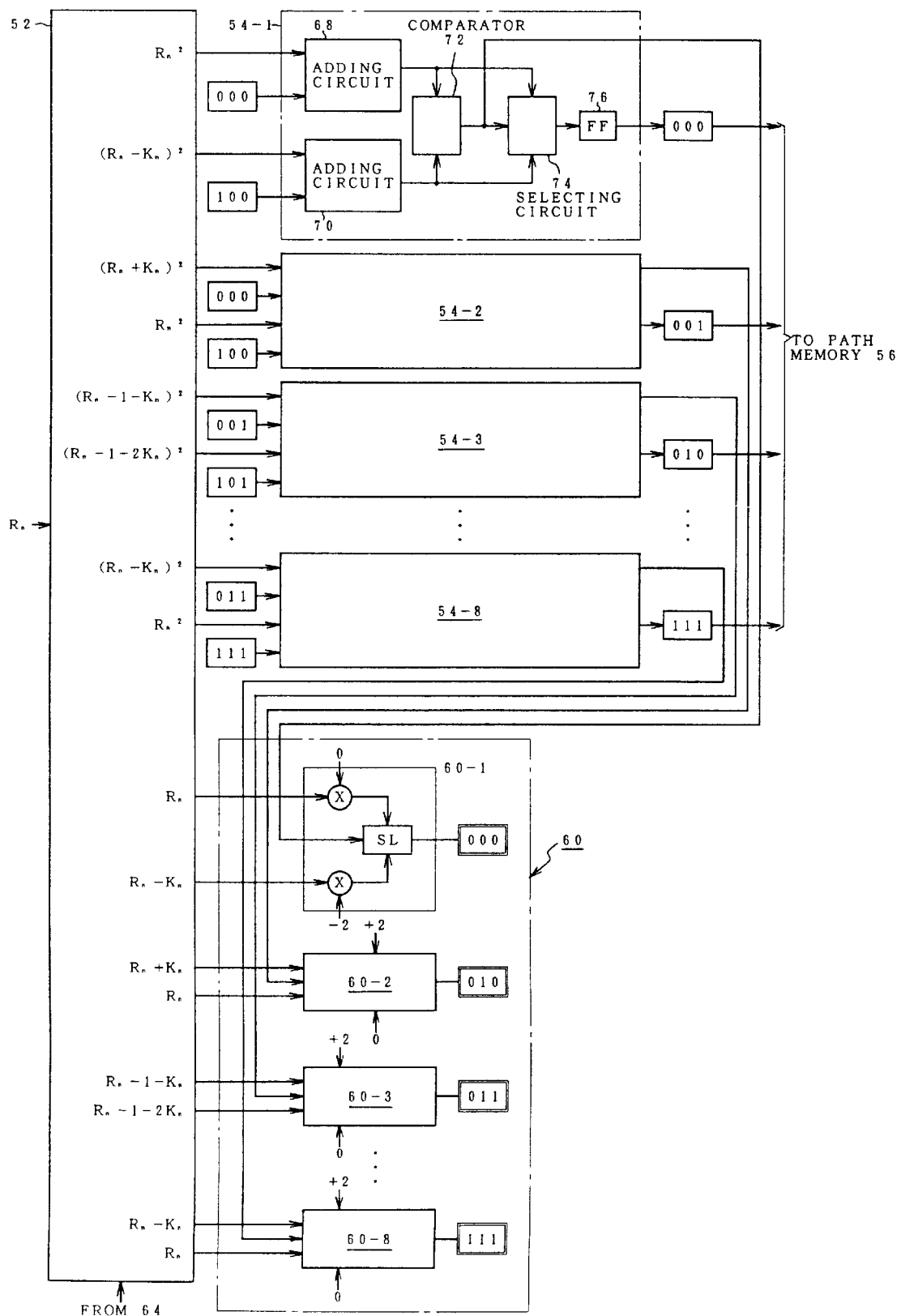
FIG. 10 is a block diagram showing a part of another specific embodiment of the automatic equalization maximum likelihood detecting circuit in FIG. 2.
Figure 11:
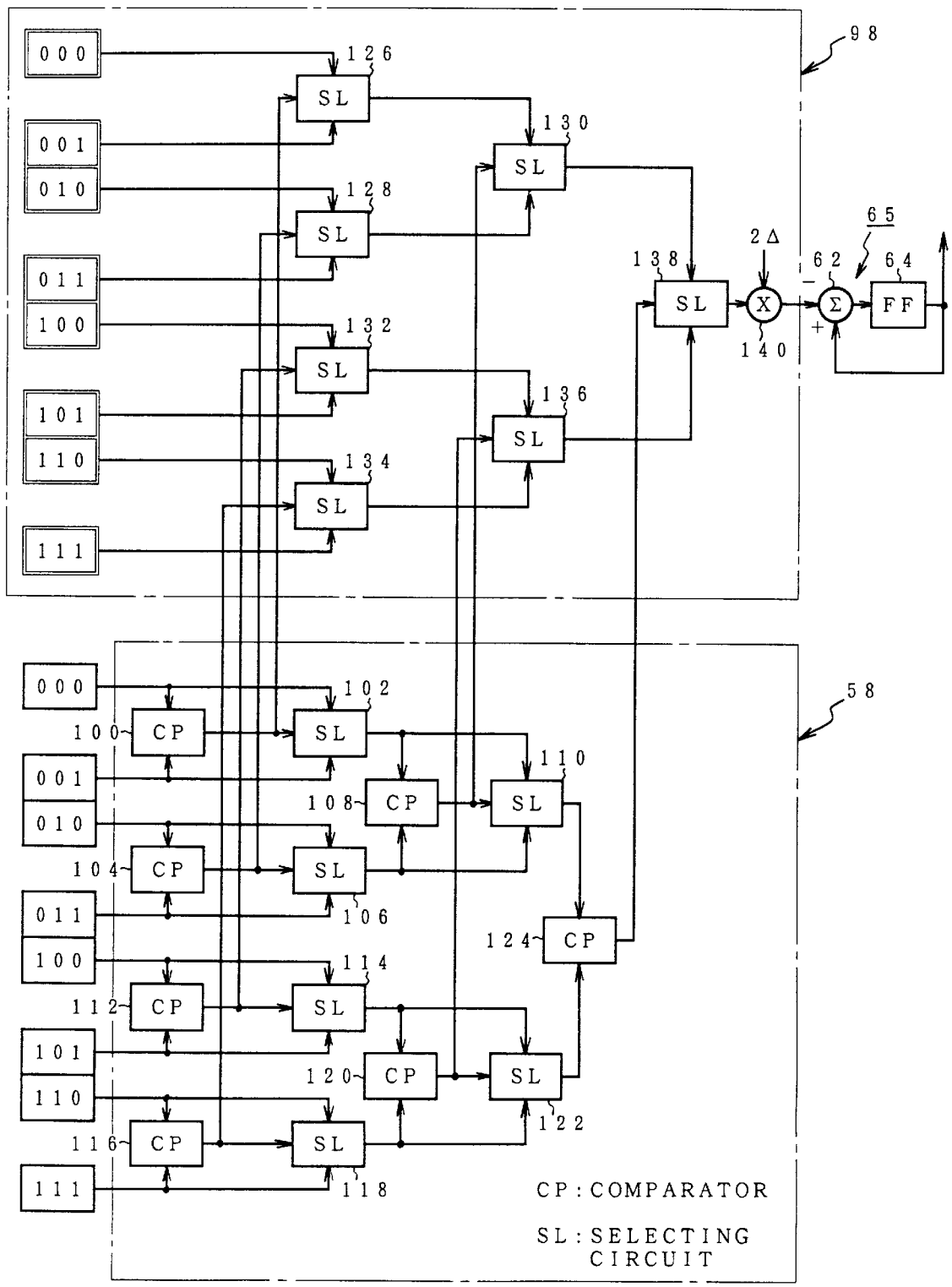
FIG. 11 is a block diagram showing a specific embodiment of the automatic equalization maximum likelihood detecting circuit subsequent to FIG. 10.

FIGS. 10 and 11 are block diagrams of another specific embodiment of the automatic equalization maximum likelihood detecting circuit according to the invention of FIG. 3. The embodiment is characterized in that the maximum inclination arithmetic operation table as in the embodiment of FIG. 9 is not used but the maximum inclination value is calculated in a real-time manner and, on the basis of the judgment value of the maximum likelihood path node and the judgment value of the path metric which was judged to be a maximum likelihood path node, the corresponding value is selected and decided from a plurality of maximum inclination values. First, FIG. 10 shows the distributor 52 and $2^3$ (=8) ACS circuits 54-1 to 54-8. Such a construction is similar to that in the embodiment of FIG. 9. The maximum inclination arithmetic operating circuit 60 is further provided. The maximum inclination arithmetic operating circuit 60 has eight arithmetic operating circuits 60-1 to 60-8 corresponding to eight path nodes 000 to 111 shown by double line frames. Specifically speaking, as representatively shown in the arithmetic operating circuit 60-1, it is constructed by multipliers 92 and 94 and a selecting circuit 96. Namely, although the maximum inclination is given by the equation (9), "2" of the right side of the equation (9) and the value of the first multiplicand factor term are fixedly obtained from the path node 000 shown by the double-line frame and the four judgment values (X) which are decided from the one-preceding path nodes 000 and 100 connected to such a path node. Those values are set as constants 0 and −2 into the multipliers 92 and 94. Such constants are also determined as shown in the diagram from the relation of FIG. 6 with respect to the other remaining nodes 010 to 111. Further, since the distributor 52 obtains the value in the second multiplicand factor term of the right side of the equation (9) in the calculating step of the branch metrics for the ACS circuits 54-1 to 54-8, this value is inputted to the corresponding arithmetic operating circuits 60-1 to 60-8 as shown in the diagram. As mentioned above, the maximum inclination values of the multiplication coefficients corresponding to the path nodes 000 to 111 are respectively outputted from the arithmetic operating circuits 60-1 to 60-8 of the maximum inclination arithmetic operating circuit 60.

FIG. 11 shows the maximum likelihood path comparing circuit 58 and maximum inclination selecting circuit 98 which are provided subsequent to FIG. 10. First, the path metrics of the alive paths obtained by the selection on the maximum likelihood side in the two paths of the one-preceding path node in each path node shown by the path nodes 000 to 111 of the ACS circuits 54-1 to 54-8 in FIG. 10 are inputted to the maximum likelihood path comparing circuit 58. Every two of the path metrics of the alive paths are compared by comparator 100, 104, 112, and 116, respectively. On the basis of the comparison results, each of selecting circuits 102, 106, 114, and 118 selects smaller path metric. Two selection results are compared by comparators 108 and 120 at the second stage, respectively. A smaller one is selected by each of selecting circuits 110 and 122. A metric value of the maximum likelihood path node is selected by a comparator 124 at the final stage.

On the other hand, each of the maximum inclination values calculated by the arithmetic operating circuits 60-1 to 60-8 of the maximum inclination arithmetic operating circuit 60 in FIG. 10 is inputted to a maximum inclination selecting circuit 98 from the path nodes 000 to 111 shown by the double-line frames. Every two of those maximum inclination values are inputted to selecting circuits 126, 128, 132, and 134, respectively. On the basis of the comparison results of the comparators 100, 104, 112, and 116 at the first stage provided for the maximum likelihood path comparing circuit 58, the maximum inclination value on the maximum likelihood side is selected and supplied to selecting circuits 130 and 136 at the next stage. The comparison results of the comparators 108 and 120 at the second stage in the maximum likelihood path comparing circuit 58 are supplied to the selecting circuits 130 and 136 at the second stage. The maximum inclination values corresponding to the alive paths on the maximum likelihood side are likewise selected and inputted to a selecting circuit 138 at the third stage. On the basis of a comparison output of the comparator 124 at the third stage of the maximum likelihood path comparing circuit 58, the selecting circuit 138 selects and outputs the maximum inclination value corresponding to the maximum likelihood path node. Subsequent to the selecting circuit 138, a multiplier 140 is provided. In the embodiment, the multiplier 140 multiplies an updating step width 2Δ and supplies the resultant value to the multiplication coefficient updating circuit 65 at the final stage.

Figure 12:
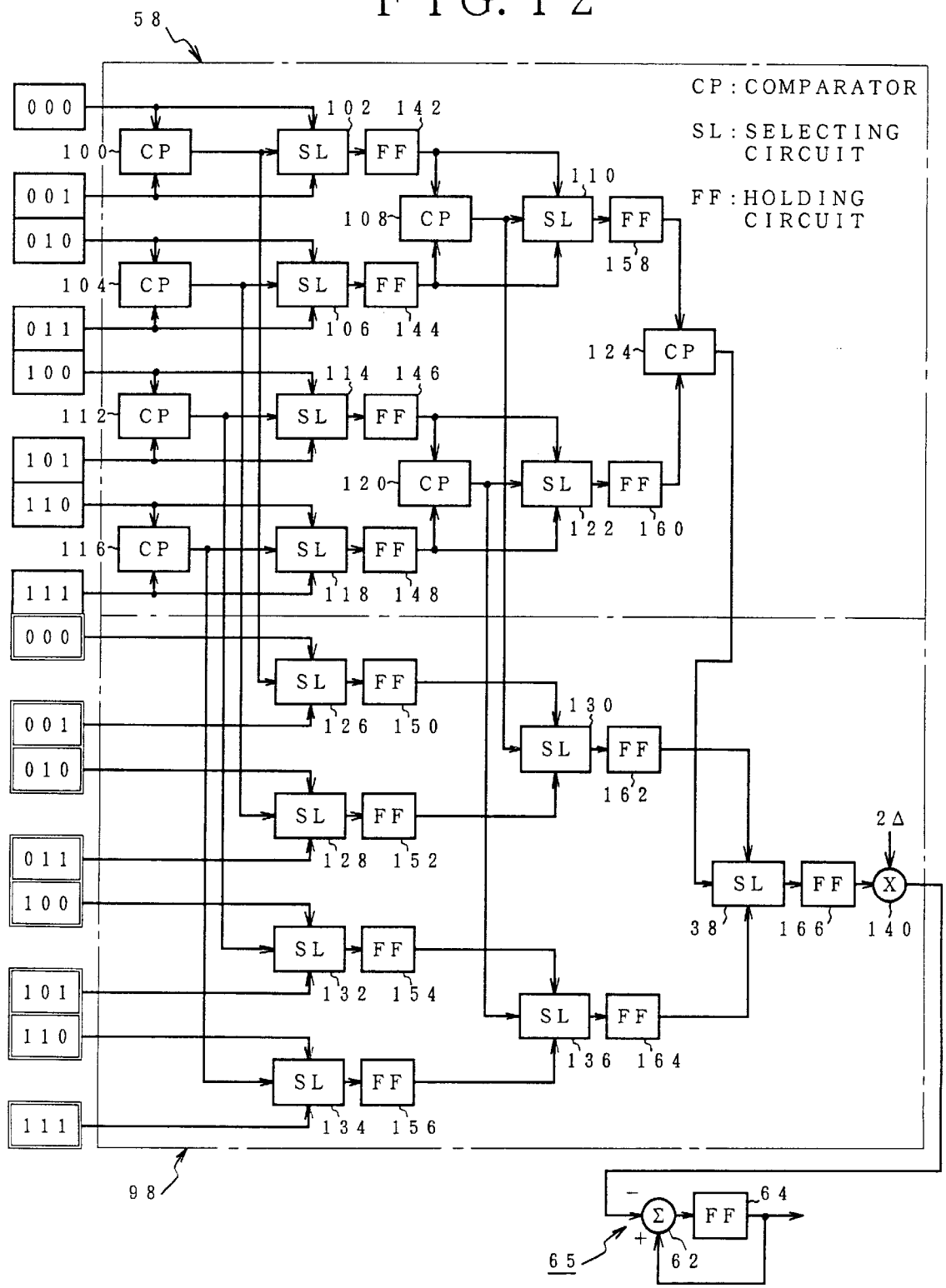
FIG. 12 is a block diagram in the case where the detecting circuit in FIG. 11 is constructed in a pipeline form.

FIG. 12 shows a modification of FIGS. 10 and 11 and is characterized in that the processes of the maximum likelihood path comparing circuit 58 and maximum inclination selecting circuit 98 in FIG. 11 are executed as pipeline processes. Namely, in the embodiment of FIG. 12, subsequent to the selecting circuits 102, 106, 114, 118, 126, 128, 132, and 134 at the first stage provided for the maximum likelihood path comparing circuit 58 and maximum inclination selecting circuit 98, FFs 142, 144, 146, 148, 150, 152, 154, and 156 are provided and the first stage of the pipeline processes is constructed by the component elements so far. Subsequent to the selecting circuits 110, 122, 130, and 136 at the second stage provided for the maximum likelihood path comparing circuit 58 and maximum inclination selecting circuit 98, FFs 158, 160, 162, and 164 are provided and the second stage of the pipeline processes is constructed here. Further, an FF 166 is provided subsequent to the selecting circuit 138 at the final stage, thereby constructing the third stage of the pipeline processes. Thus, the maximum likelihood path comparing circuit 58 and maximum inclination selecting circuit 98 successively obtain the maximum inclination values by the pipeline processes of three stages and can update the multiplication coefficients in such a direction as to reduce the branch metric.

Figure 13:
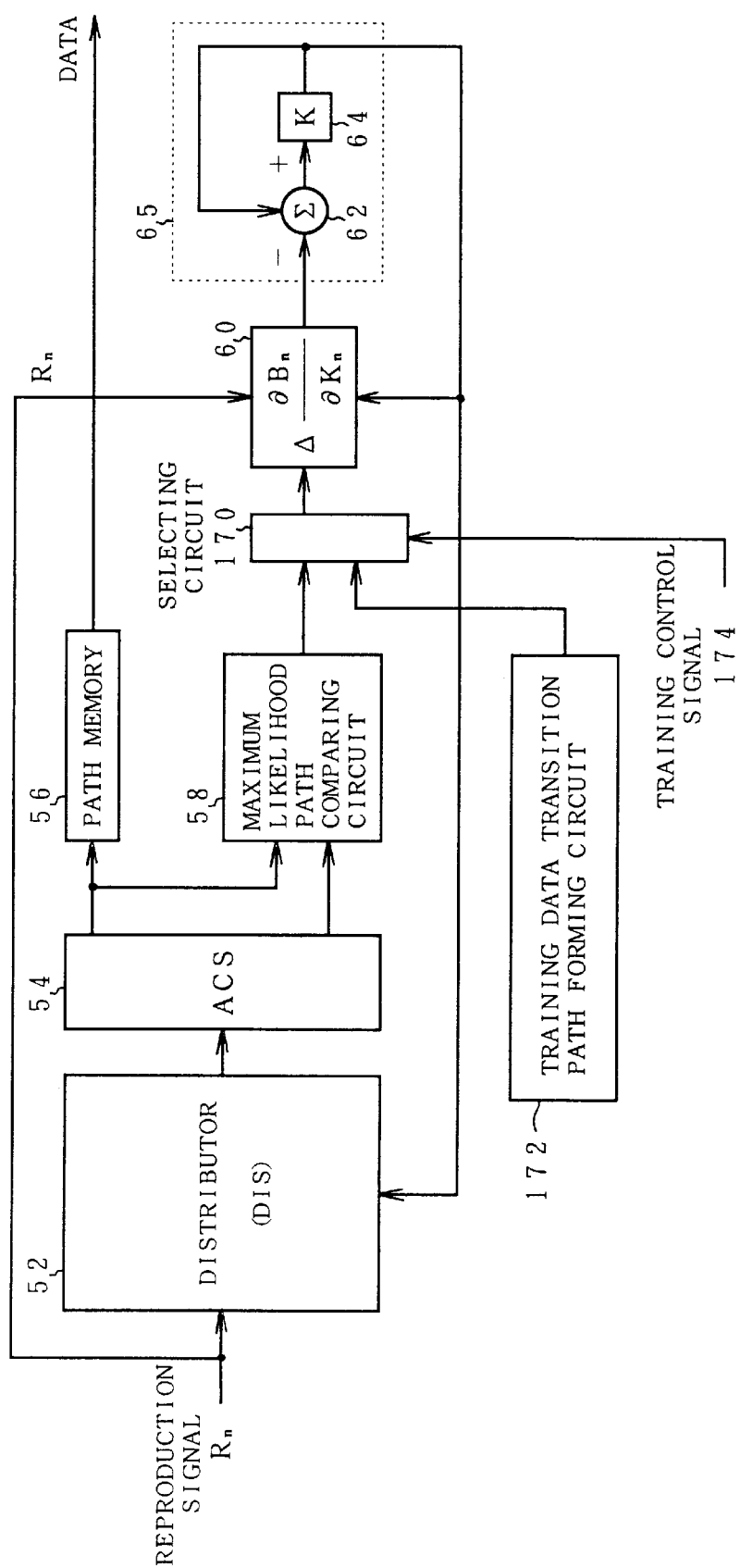
FIG. 13 is a block diagram of the second embodiment of the automatic equalization maximum likelihood detecting circuit in FIG. 2.

FIG. 13 shows the second embodiment of the automatic equalization maximum likelihood detecting circuit of the invention and is characterized in that a selecting circuit 170 and a training data transition path forming circuit 172 are further provided for the first embodiment of FIG. 3. At the time of the initialization in which the head is sought to a target cylinder of the magnetic disk that is determined by the head number and cylinder address designated by a read access from the upper apparatus and is set into an on-track state, the training data transition path forming circuit 172 performs a training of the equalizer by predetermined training data written at the head of the sector of the disk medium. In case of the training data in which the reproduction signal Rn is obtained at the time of the initialization, a transition path for the training data is predetermined. The transition path is supplied to the selecting circuit 170 from the training data transition path forming circuit 172 and is outputted to the maximum inclination arithmetic operating circuit 60 by a training control signal 174 in place of the maximum likelihood path node selected by the maximum likelihood path comparing circuit 58 upon training. The maximum inclination of the multiplication coefficients of the filter in the maximum likelihood path node adapted to the training data is calculated. The multiplication coefficients are updated in such a direction as to rapidly reduce the branch metric. By using such information of the maximum likelihood path node from the training data transition path forming circuit 172 at the time of the initialization by the training, the convergence of the automatic equalization by the training data can be promptly executed.

Figure 14:
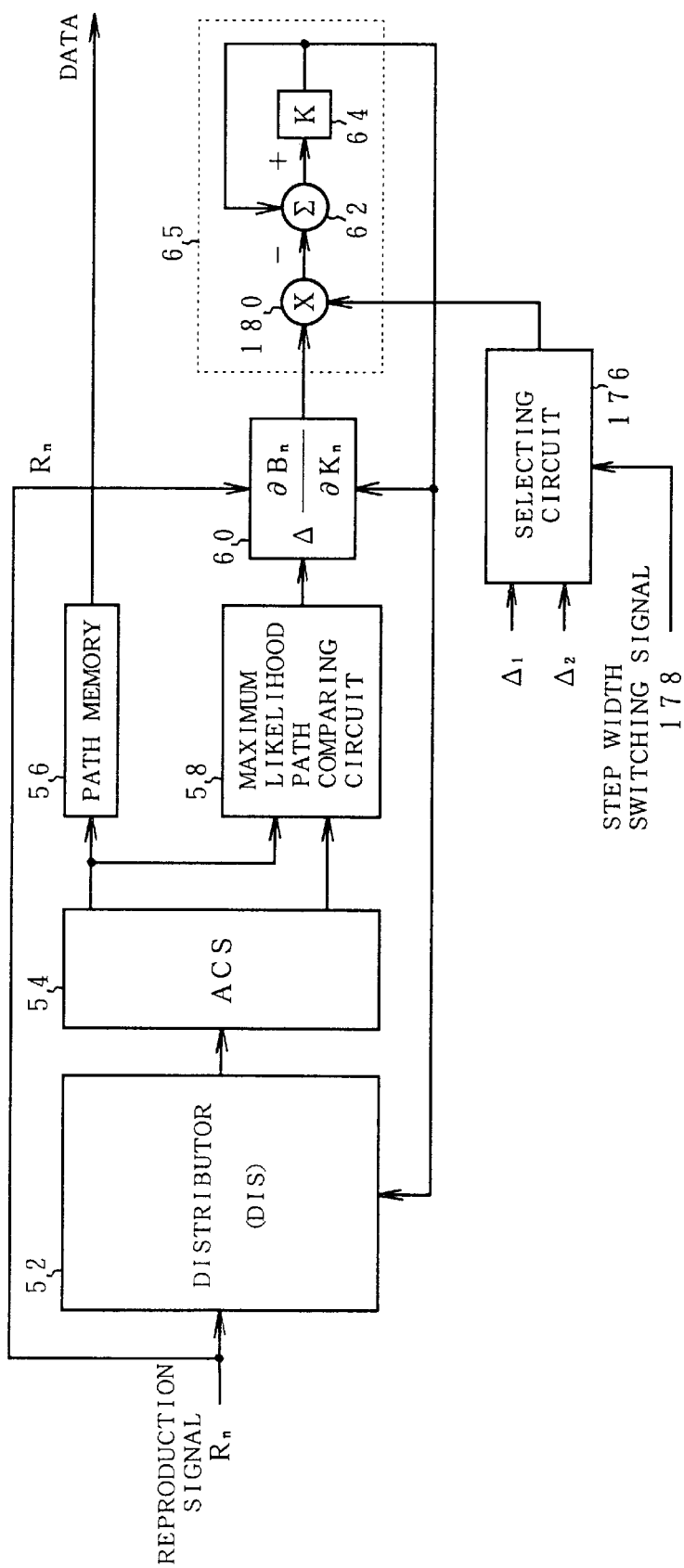
FIG. 14 is a block diagram of the third embodiment of the automatic equalization maximum likelihood detecting circuit in FIG. 2.

FIG. 14 shows the third embodiment of the automatic equalization maximum likelihood detecting circuit of the invention and is characterized in that a step width that is used in the multiplication coefficient updating circuit 65 can be further switched for the first embodiment of FIG. 3. Namely, a multiplier 180 is newly provided at the input stage of the multiplication coefficient updating circuit 65. Updating step widths Δ1 and Δ2 of the maximum inclination can be selected for the multiplier 180 by a selecting circuit 176. A step width switching signal 178 is supplied to the selecting circuit 176 for the initialization period of time during which the head is positioned to the target cylinder. For example, now assuming that the updating step width Δ1 is small and the updating step width Δ2 is large, the larger updating step width Δ2 is selected and outputted to the multiplier 180. The updating step width of the maximum inclination is increased for the initialization period of time, thereby promptly converging the error.

Figure 15:
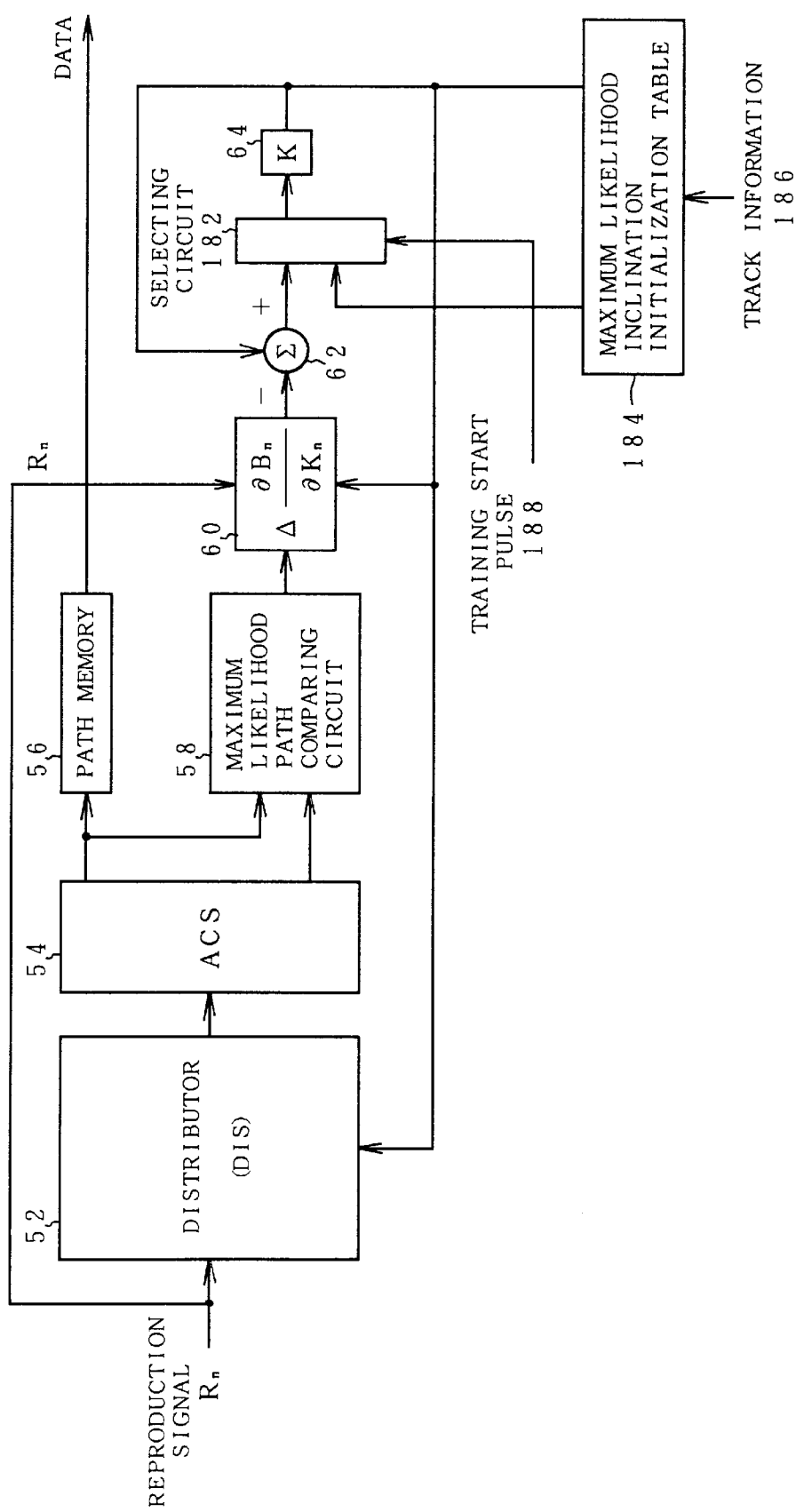
FIG. 15 is a block diagram of the fourth embodiment of the automatic equalization maximum likelihood detecting circuit in FIG. 2.

FIG. 15 shows the fourth embodiment of the automatic equalization maximum likelihood detecting circuit of the invention and is characterized in that a selecting circuit 182 and a maximum inclination initialization table 184 are provided for the multiplication coefficient updating circuit 65. Multiplication coefficients have previously been stored in the maximum inclination initialization table 184 on a track unit basis. The selecting circuit 182 is switched to the maximum inclination initialization table 184 side by a training start pulse 188. The corresponding maximum inclination value is read out from the maximum inclination initialization table 184 by track information 186 at that time and is updated by the multiplication coefficient updating circuit 65. Further, for the maximum inclination initialization table 184, the multiplication coefficients held in the holding circuit 64 are stored into the maximum inclination initialization table 184 and updated by the end of the training. Therefore, although the maximum inclination value is the fixed value at first, it is updated to the maximum inclination obtained by the training at that time after the second time. The updating of the multiplication coefficients upon training initialization using the maximum inclination value obtained by what is called a learning can be realized.

FIG. 16 shows the fifth embodiment of the automatic equalization maximum likelihood detecting circuit of the invention. In the embodiment, the pre-filter 24 is provided at the front stage of the automatic equalization maximum likelihood detecting circuit 26 and the equalization is executed by the pre-filter 24 so as not to be influenced by the variations of the head and disk medium and, further, by a difference of the track position. As mentioned above, by providing the pre-filter 24 and eliminating the variations of the head and disk medium and the difference of the track position, the number of stages of the transversal equalizer that is maximum likelihood detected as a coupling code in the automatic equalization maximum likelihood detecting circuit 26 can be reduced. The number of states in the maximum likelihood detection can be reduced.

Figure 17:
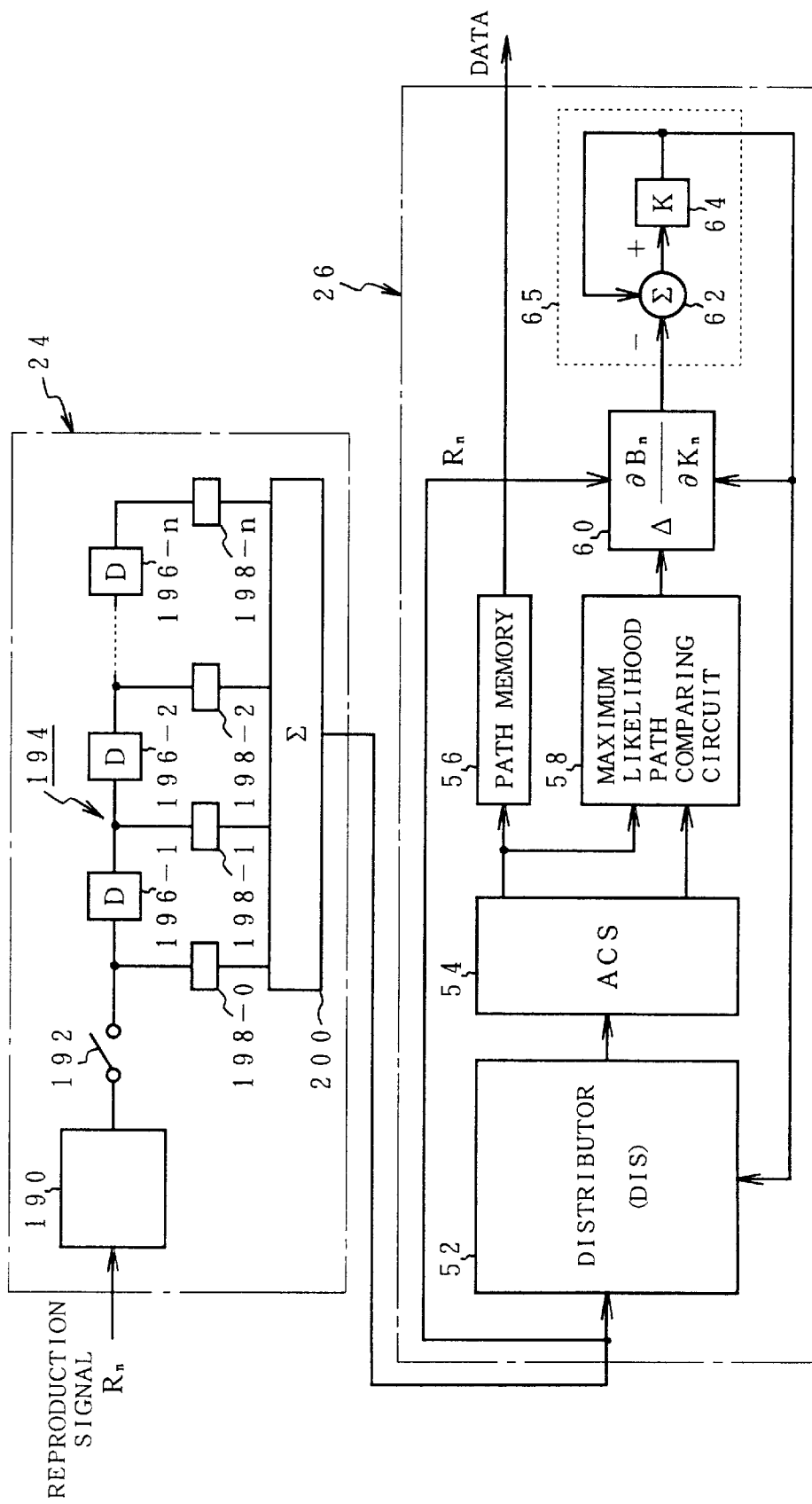
FIG. 17 is a block diagram of the sixth embodiment of the automatic equalization maximum likelihood detecting circuit in FIG. 2.

FIG. 17 shows the sixth embodiment of the automatic equalization maximum likelihood detecting circuit of the invention and is characterized in that the pre-filter 24 provided at the front stage of the automatic equalization maximum likelihood detecting circuit 26 is constructed by an analog pre-filter 190, a sampler 192, and a pre-transversal filter 194. The analog pre-filter 190 is, for example, a low pass filter. By properly setting a cut-off frequency and a boost, a waveform distortion due to the variations of the head and disk medium and the difference of the track position is equalized. The sampler 192 samples a filter output of the analog pre-filter 190 at a sampling period and converts to digital data and supplies the digital data to the pre-transversal filter 194. The pre-transversal filter 194 equalizes the waveform so as to compensate an equalization residual by the analog pre-filter 190 and executes an equalization so as to eliminate the waveform distortion due to the variations of the head and disk medium and the difference of the track position. According to the pre-filter 24 in FIG. 17, as compared with the fifth embodiment of FIG. 16, a precision of the pre-equalization is further improved, the number of stages of the transversal equalizer which is maximum likelihood detected as a coupling code can be reduced, the number of states in the maximum likelihood detection is reduced, and the simplification of the circuit construction and the improvement of the processing speed can be realized.

According to the invention as mentioned above, simultaneously with the maximum likelihood detection to obtain the alive paths in each path node, the maximum likelihood path node is determined. The maximum inclination value of the multiplication coefficient which becomes a weight of data train of the convolution code corresponding to the multiplication coefficients of the filter in the maximum likelihood path node determined is calculated. The multiplication coefficients are updated on the basis of the maximum inclination value in such a direction as to reduce the branch metric. The judgment value on the way of the maximum likelihood detection is used as an estimation value of the filter. Therefore, the convergence of the errors in the case where the equalization errors occur can be promptly performed. The maximum likelihood detection with a small number of equalization errors is realized. The invention largely contributes to the decrease in desired S/N ratio when the recording density rises. The reliability can be remarkably improved.

Although the above embodiments have been shown and described with respect to the magnetic disk apparatus, the invention can be directly applied to any other information reproducing apparatus so long as it uses the maximum likelihood decoding method. The invention is not limited to the foregoing preferred embodiments but many modifications and variations of the invention are possible. Particularly, the invention is not limited by the numerical values shown in the embodiments.

What is claimed is:

1. An information reproducing apparatus, comprising:
   a reproducing channel for reproducing a reproduction signal (Rn) from a medium using a head; and
   an automatic equalization maximum likelihood detecting circuit for performing an automatic equalization said reproduction signal simultaneously with a demodulation of data based on a maximum likelihood detection each time said reproduction signal (Rn) of said reproducing channel is sampled and inputted,
   wherein said automatic equalization maximum likelihood detecting circuit comprises:
      a distributor for coupling a virtual transversal filter for presuming a non-equalized signal ($\hat{Y}n$) from a code train (Zn) and a convolution code of data which is produced by an intercede interference that is caused in magnetic recording and reproducing steps, thereby arithmetically operating a branch metric (Bn) on the basis of a non-equalized signal ($\hat{Y}n$) presumed from a data train (Dn) and said reproduction signal (Rn);
      an add/compare/select circuit for judging the maximum likelihood path at every path node on the basis of the branch metric (Bn) which was arithmetically operated by said distributor;
      a path memory for storing a judged result of the maximum likelihood path at every path node which was judged by said add/compare/select circuit;
      a maximum likelihood path comparing circuit for comparing path metrics of all states obtained by said add/compare/select circuit, thereby deciding the maximum likelihood path node;
      a maximum inclination arithmetic operating circuit for calculating a maximum inclination of multiplication coefficients (Kn) of said virtual transversal filter at the maximum likelihood path node obtained by said maximum likelihood path comparing circuit; and
      a multiplication coefficient updating circuit for arithmetically calculating multiplication coefficients which are used in the maximum likelihood detection at the next sampling timing on the basis of the maximum inclination calculated by said maximum inclination arithmetic operating circuit, thereby updating said multiplication coefficients (Kn) of said distributor.

2. An automatic equalization maximum likelihood detecting method of a recording/reproducing apparatus, comprising:
   a reproducing step of outputting a reproduction signal from a medium using a head;
   a maximum likelihood detecting step of coupling a virtual transversal filter for presuming a non-equalized signal ($\hat{Y}n$) from a code train Zn and a convolution code of data which is produced by an intercede interference that is caused in magnetic recording and reproducing steps, thereby arithmetically operating a branch metric (Bn) on the basis of a non-equalized signal ($\hat{Y}n$) presumed from a data train (Dn) and said reproduction signal (Rn), judging the maximum likelihood path at every path node on the basis of said branch metric (Bn), and storing a judged result of the maximum likelihood path into a path memory; and
   an automatic equalizing step of deciding the maximum likelihood path node by comparing path metrics of all states, calculating a maximum inclination of the multiplication coefficients of said virtual transversal filter in said maximum likelihood path node, arithmetically operating the multiplication coefficients on the basis of the maximum inclination of said multiplication coefficients, and updating multiplication coefficients which are used in said maximum likelihood detecting step at a next sampling timing.

3. An apparatus according to claim 1, wherein said maximum inclination arithmetic operating circuit comprises:
   a selecting circuit for selecting a path judgment value in said add/compare/select circuit on the basis of a decision result of the maximum likelihood path node by said maximum likelihood path comparing circuit;
   an information table for reading out a coefficient and a constant of the inclination value of the maximum inclination arithmetic operation by the maximum likelihood path node decided by said maximum likelihood path comparing circuit and by referring to the path judgment value selected by said selecting circuit; and
   an arithmetic operating circuit for arithmetically operating the maximum inclination of the multiplication coefficients by using said coefficient and said constant which were read out from said information table.

4. An apparatus according to claim 1, wherein said maximum inclination arithmetic operating circuit comprises:
   an arithmetic operating circuit for arithmetically operating the maximum inclination values with respect to all of the path nodes;
   a maximum likelihood path comparing circuit for comparing the path metrics of said add/compare/select circuit and for selecting the maximum likelihood path; and
   a selecting circuit for selecting and deciding the maximum inclination value of said maximum likelihood path from the maximum inclination values of said path nodes on the basis of a comparison result of said maximum likelihood path selecting circuit and for outputting.

5. An apparatus according to claim 4, wherein a circuit to hold the path metric on the way of the comparison is provided for said maximum likelihood path comparing circuit, a circuit to hold the maximum inclination value on the way of the selection is provided for said selecting circuit, and pipeline processes are executed.

6. An apparatus according to claim 1, wherein said automatic equalization maximum likelihood detecting circuit further has:
   a training data transition path forming circuit for forming the maximum likelihood path node which is decided by training data; and
   a selecting circuit for selecting the maximum likelihood path node formed by said training data transition path forming unit and for outputting to said maximum inclination arithmetic operating circuit upon initialization in place of the maximum likelihood path node determined by said maximum likelihood path comparing circuit,
   and wherein at the time of initialization, the multiplication coefficients of said virtual transversal filter are selected by the path node which is determined by the training data and the maximum inclination is updated.

7. An apparatus according to claim 1, wherein said multiplication coefficient updating circuit has:

a selecting circuit for switching at least two large and small updating step widths; and a multiplying circuit for changing an amplitude of the maximum inclination value by using the updating step width selected by said selecting circuit, and wherein the larger updating step width is selected by said selecting circuit and the updating step of the maximum inclination is increased for an initial period of time.

8. An apparatus according to claim 1, wherein said multiplication coefficient updating circuit comprises:

an information table in which the multiplication coefficients have been stored every track of the medium; and an selecting circuit for selecting the multiplication coefficients of said information table which was referred by the track information at the time of the training in place of an output of said maximum inclination arithmetic operating circuit, and wherein at the end of the training, initial values of the multiplication coefficients of said table are updated by the multiplication coefficients obtained by said training.

9. An apparatus according to claim 1, wherein a pre-filter for equalizing to a code of said reproducing channel is provided at the front stage of said automatic equalization maximum likelihood detecting circuit.

10. An apparatus according to claim 1, wherein said pre-filter has:

an analog pre-filter;

a sampler for sampling an output signal of said analog pre-filter by a sampling period; and a transversal filter for inputting sample data by said sampler and equalizing a waveform of said sample data.

11. An automatic equalization maximum likelihood detecting method of a recording/reproducing apparatus, comprising the steps of:

demodulating data by a judgment of a maximum likelihood path in which a convolution code obtained by coupling a transversal filter to a code of a reproducing channel for reproducing data from a medium by using a head is used as a target; and changing a weight of a convolution code so as to reduce a branch metric by using a judgment result of said maximum likelihood path.

12. A method according to claim 2, wherein in said automatic equalizing step, the maximum inclination values are arithmetically operated with respect to all path nodes and the maximum inclination value of said maximum likelihood path is selected and decided from the maximum inclination values of the path nodes selected by the comparison of each path metric obtained in said maximum likelihood detecting step.

13. A method according to claim 12, wherein in said automatic equalizing step, the path metric on the way of the comparison is held and the maximum inclination value on the way of the selection is likewise held, thereby performing pipeline processes.

14. A method according to claim 2, wherein in said automatic equalizing step, the multiplication coefficients of said virtual transversal filter are selected by the path node that is decided by training data upon initialization and the maximum inclination is updated.

15. A method according to claim 2, wherein in said automatic equalizing step, an updating step width of said maximum inclination is increased for an initial period of time.

16. A method according to claim 2, wherein in said automatic equalizing step, upon training, the maximum inclination value of the multiplication coefficients is read out with reference to an information table by track information of the medium and next multiplication coefficients are updated, and at the end of the training, initial values of the multiplication coefficients in said table are updated by the multiplication coefficients obtained by the training.

17. A method according to claim 2, wherein a pre-equalizing step of equalizing to a code of said reproducing channel is provided before said automatic equalizing step and said maximum likelihood detecting step.

18. A method according to claim 2, wherein in said pre-equalizing step, a reproduction signal is equalized in an analog manner and is subsequently sampled by a sampling period and, after that, it is waveform equalized in a digital manner.

* * * * *

UNITED STATES PATENT AND TRADEMARK OFFICE
CERTIFICATE OF CORRECTION

PATENT NO. : 5,917,862
DATED : June 29, 1999
INVENTOR(S) : Shimoda

It is certified that error appears in the above-identified patent and that said Letters Patent is hereby corrected as shown below:

On the Title page:

Under "[57] Abstract", after "results are stored into a path memory" delete "56"

Column 15, line 9, after "equalization" insert --of--

Column 15, line 16, after "filter" insert --which is--

Column 15, line 56, delete "Zn" and insert --(Zn)-- therefor

UNITED STATES PATENT AND TRADEMARK OFFICE
CERTIFICATE OF CORRECTION

PATENT NO. : 5,917,862
DATED : June 29, 1999
INVENTOR(S) : Shimoda

It is certified that error appears in the above-identified patent and that said Letters Patent is hereby corrected as shown below:

Column 16, line 44, delete "on the way of" and insert --during-- therefor

Column 16, lines 46-47, delete "on the way of" and insert --during-- therefor

Column 16, line 67, delete "has" and insert --comprises-- therefor

Column 17, line 11, before "comprises" insert --further--

Column 17, line 14, after "stored" insert --in--

UNITED STATES PATENT AND TRADEMARK OFFICE
CERTIFICATE OF CORRECTION

PATENT NO. : 5,917,862
DATED : June 29, 1999
INVENTOR(S) : Shimoda

It is certified that error appears in the above-identified patent and that said Letters Patent is hereby corrected as shown below:

Column 17, line 15, delete "an" and insert --a-- therefor

Column 18, line 13, delete "on the way of" and insert --during-- therefor

Column 18, lines 14-15, delete " on the way of" and insert --during-- therefor

Signed and Sealed this

Twentieth Day of March, 2001

Attest:

NICHOLAS P. GODICI

*Attesting Officer*   *Acting Director of the United States Patent and Trademark Office*